United States Patent [19]

Neissel

[11] 3,760,183

[45] Sept. 18, 1973

[54] NEUTRON DETECTOR SYSTEM
[75] Inventor: John P. Neissel, San Jose, Calif.
[73] Assignee: General Electric Company, San Jose, Calif.
[22] Filed: June 8, 1972
[21] Appl. No.: 261,033

[52] U.S. Cl............... 250/252, 250/83 C, 313/93
[51] Int. Cl............................................. G01t 3/00
[58] Field of Search................. 250/83.1, 83 C; 313/93

[56] References Cited
UNITED STATES PATENTS

| | | |
|---|---|---|
| 3,375,370 | 3/1968 | Hilborn................ 250/83.1 |
| 2,728,867 | 12/1955 | Wilson................ 250/83.1 |
| 2,288,718 | 7/1942 | Kallmann et al........ 250/83.1 |
| 2,440,167 | 4/1948 | Broxon et al......... 250/83.1 |
| 2,986,636 | 5/1961 | Carlson et al........ 250/83.1 |
| 3,588,505 | 6/1971 | Johnson............... 250/83.1 |
| 3,311,770 | 3/1967 | Boyd.................. 313/93 |

Primary Examiner—James W. Lawrence
Assistant Examiner—Harold A. Dixon
Attorney—Ivor J. James, Jr. et al.

[57] ABSTRACT

A neutron detector unit and system comprising ion chamber and self-powered portions wherein signals from the ion chamber and self-powered portions are compared and the calibration of the ion chamber portion adjusted accordingly.

26 Claims, 6 Drawing Figures

NEUTRON DETECTOR SYSTEM

BACKGROUND

The invention relates to detecting units and systems thereof, comprising combined ion chambers and self-powered detectors, for detecting and measuring radiation and is described herein in connection with detecting and measuring the neutron flux in a nuclear reactor core. An in-core detector system for measuring and monitoring the neutron flux in a nuclear reactor core is shown by G.R. Parkos et al in U.S. Pat. No. 3,565,760.

Ion chambers are well-known and are shown, for example, by L.R. Boyd et al. in U.S. Pat. No. 3,043,954. Briefly such chambers comprise a pair of spaced electrodes electrically insulated from one another with a neutron sensitive material and an ionizable gas therebetween. For example, in a fission chamber the neutron sensitive material is a matertial, such as uranium, fissionable by neutrons. Thus, incident neutrons induce fissions of the uranium and the resulting fission products ionize the gas in proportion to the magnitude of the neutron flux. A direct current voltage applied between the electrodes results in an output current which is proportional to the amount of ionization and, hence, proportional to the neutron flux. There are other known types of neutron sensitive ion chambers, as mentioned in U.S. Pat. No. 3,043,954, wherein neutron sensitive material, such as boron trifluoride, is in gaseous form.

As neutron detectors, ion chambers have the advantages of sensitivity, adequate life, and prompt response to changes in neutron flux. However, their response tends to be non-linear and the output current versus neutron flux for any given chamber is not exactly predictable whereby each must be calibrated. Furthermore, during use they must be recalibrated rather frequently because of loss of sensitivity due to burn-up of the neutron sensitive material. (For example, in the system shown in U.S. Pat. No. 3,565,760 a retractable traversable chamber is provided to periodically recalibrate the fixed in-core chambers.) Also, such ion chambers are relatively fragile and malfunctions of various kinds can cause changes in sensitivity, the presence and magnitude of which may remain undetected until calibration.

Self-powered neutron detectors are also well-known as described by M.G. Mitelman et al. in an article entitled "Transformation of the Energy of Short-Lived Radioactive Isotopes," Atomnaya Energiya, Vol. 10, No. 1, pp. 72–73, January 1961 and as shown, for example, by Harris in U.S. Pat. No. 3,147,379, Garlick et al. in U.S. Pat. No. 3,259,745, Hilborn in U.S. Pat. No. 3,375,370, Treinenk et al in U.S. Pat. No. 3,390,270 and Anderson in U.S. Pat. No. 3,400,289.

The self-powered detector is so named because it produces an electron current without the need for an external source of power. Briefly, a self-powered detector comprises an emitter electrode and a collector electrode on opposite sides of a solid dielectric material. There are many suitable emitter, collector and dielectric materials as evidenced by the foregoing references. There are also several theories of operation, for example, activation (beta decay), internal conversion, Compton effect, depending upon the materials used.

In any event, by appropriate choice of electrode volumes and/or materials a greater number of electrons are produced by the emitter electrode in a neutron flux as compared to the collector electrode and the resulting difference in production rate provides a signal current proportional to the magnitude of the neutron flux.

The self-powered detector has the advantages of good linearity and ruggedness. However, where a beta emitter material such as rhodium is used as the emitter electrode, the equilibrium response to a change in neutron flux is delayed by the radioactive life of the isotope formed as a result of the neutron irradiation of the emitter. In some cases this delay may be several minutes—a delay too great to provide the desired prompt core protective responses called for by systems such as described in U.S. Pat. No. 3,565,760.

SUMMARY

An object of the invention is to provide both prompt and accurate measurement of neutron flux. This and other objects are achieved by providing a detector unit comprising both ion chamber and self-powered detector elements and a system for determining initial and subsequent sensitivities for continuous or periodic recalibration of the ion chamber detector element.

DRAWING

The invention is described in greater detail hereinafter with reference to the accompanying drawing wherein.

DESCRIPTION

Figure 1:
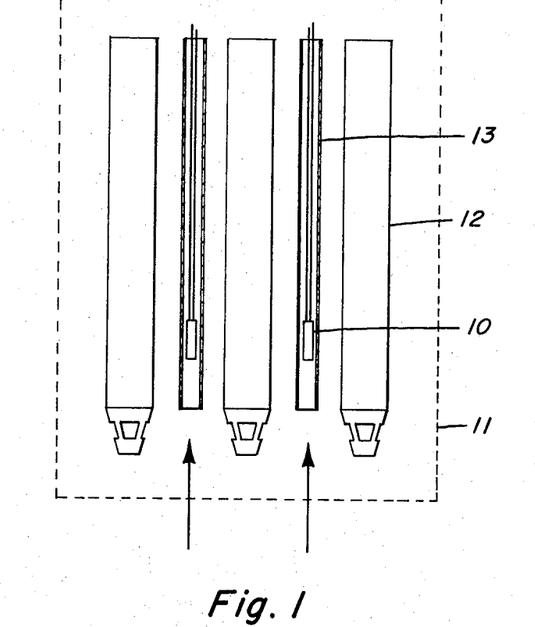
FIG. 1 is a schematic illustration of detector units in a reactor core.

Illustrated schematically in FIG. 1 is a plurality of detector units 10 positioned in a nuclear reactor core 11 to monitor the neutron flux therein. As is well known, such a core comprises a plurality of spaced fuel assemblies 12 each containing a plurality of elements or rods containing fissile material such as U–235. Protective tubes 13 are positioned in spaces between the fuel assemblies 12 to receive the detector units 10. A coolant is circulated (by means not shown) through the fuel assemblies to extract heat therefrom. The tubes 13 may be sealed or may be open, as shown, to receive a flow of coolant past the detector units. In practice a number of detector units are distributed in a predetermined arrangement in the core, including several detector units at different core elevations in each tube 13, to provide an accurate indication of the magnitude and distribution of the neutron flux in the core as shown and described in greater detail in U.S. Pat. No. 3,565,760.

Figure 2:
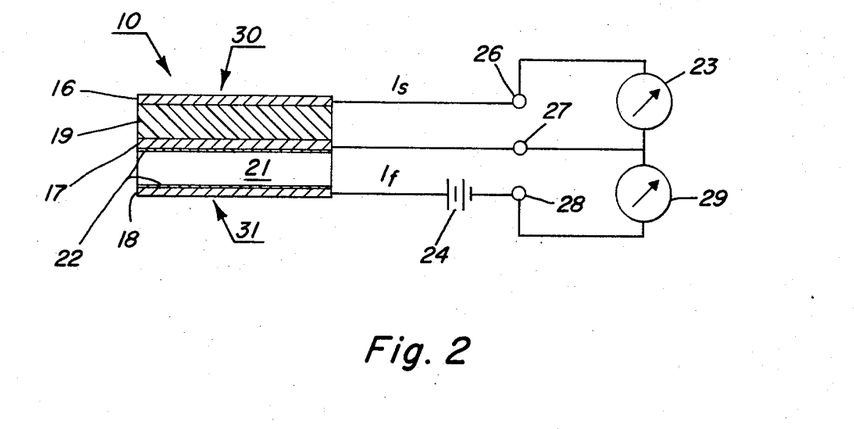
FIG. 2 is a schematic illustration of a detector unit.

A detector unit 10 for use in neutron detection system in accordance with the invention is shown schematically in FIG. 2. The detector unit includes three spaced conductive electrodes 16, 17 and 18. The space between electrodes 16 and 17 is filled with a dielectric material 19 such as a light metal oxide, for example, aluminum oxide. The space 21 between electrodes 17 and 18 is sealed and is filled with an ionizable gas, for example, a noble gas such as argon. Carried on the surface of one or both of the electrodes 17 and 18 is a film, layer or coating 22 of neutron activatable material, for example, fissionable uranium.

The electrodes 16 and 17 with dielectric material 19 therebetween constitute a self-powered portion 30 of the detector unit 10. Therefore, one of the electrodes 16 or 17, either by difference in volume or choice of material constitutes an emitter electrode while the other constitutes a collector electrode. For example, the electrode 17 may be formed of a material such as rhodium to provide an emitter electrode while electrode 16 may be formed of a material such as stainless steel to provide a collector electrode. When exposed to a neutron flux a non-zero net current flow is created between electrodes 16 and 17 and a resulting current $I_s$, proportional to the magnitude of the neutron flux can be detected by an ammeter 23 connected to respective terminals 26 and 27.

The electrodes 17 and 18 with ionizable gas and neutron activatable material 22, such as fissionable material, therebetween consistitute a fission chamber portion 31 of the detector unit 10. In the presence of a neutron flux the coating 22 of fissionable material undergoes fission reactions at a rate proportional to the neutron flux. The resulting fission products cause ionization of the gas in space 21 in proportion to the number of fissions. A power supply 24 of appropriate voltate connected between electrodes 17 and 18 results in collection of ion pairs by the electrodes. Thus a resulting current $I_f$ proportional to the neutron flux can be detected by an ammeter 29 connected to respective terminals 27 and 28.

The sensitivity of a neutron detector can be expressed as the magnitude of the output current from the detector versus the magnitude of the neutron flux to which it is exposed. The sensitivity of a neutron detector decreases with use because of conversion (burn-up) of the neutron-activatable material.

The sensitivity of the self-powered portion 30 of the detector unit 10 can be expressed as:

$$S_s(t) = S_s(0) \exp(-\sigma_s \phi t)$$

(1)

where
$t$ is the time of exposure;
$S_s(t)$ is the sensitivity of self-powered portion 30 at time $t$;
$S_s(0)$ is the initial sensitivity;
$\phi$ is the average neutron flux over time $t$;
$\sigma_s$ is the burn-up (absorption) cross section of the emitter material;
and
$\exp(-\sigma_s \phi t) = e^{(-\sigma_s \phi t)}$ where $e$ is the base of the natural system of logarithms.

Similarly the sensitivity of the fission chamber portion 31 of detector unit 10 can be expressed as:

$$S_f(t) = S_f(0) \exp(-\sigma_f \phi t)$$

(2)

where
$S_f(t)$ is the sensitivity of the fission chamber 31 at time $t$;
$S_f(0)$ is the initial sensitivity; and $\sigma_f$ is the burn-up (absorption) cross section of the fissionable material 22.

As mentioned hereinbefore, the response of the self-powered portion 30 is more linear and its sensitivity is more predictable than that of the fission-chamber portion 31. Therefore, in accordance with the system of the invention, the signals from the self-powered portion 30 are utilized to provide compensation for the more unpredictable changes in the sensitivity of the fission chamber portion 31. This is accomplished as follows.

If the value of the current from the fission chamber is divided by the value of the current from the self-powered portion at the time of initial exposure to a neutron flux to provide an initial ratio deisgnated $R(0)$, then $$R(0) = S_f(0)\phi / S_s(0)\phi$$

(3)

If at exposure time $t$ this current ratio is designated $R(t)$, then $$R(t) = S_f(t)\phi/S_s(t)\phi = S_f(0) \exp(-\sigma_f \phi t)/S_s(0) \exp(-\sigma_s \phi t)$$

(4)

Combining (3) and (4) provides:

$$R(t) = R(0) \exp[-(\sigma_f - \sigma_s)\phi t]$$

(5)

or $$\phi t = 1/\sigma_f - \sigma_s [Ln\, R(0) - Ln R(t)]$$

(6)

where $Ln$ indicates logarithm to the base $e$.

The values of $\sigma_f$ and $\sigma_s$ are well-known, therefore, the value of the neutron exposure or fluence $\phi t$ can be obtained from (6) from the two measured quantities $R(0)$ and $R(t)$. This value of neutron exposure $\phi t$ then can be used in the relationship (1) to obtain the present (at exposure time $t$) sensitivity of the fission chamber. The value $S_f(t)$ thus obtained then can be used to make sensitivity compensating adjustment as described hereinafter.

Figure 3:
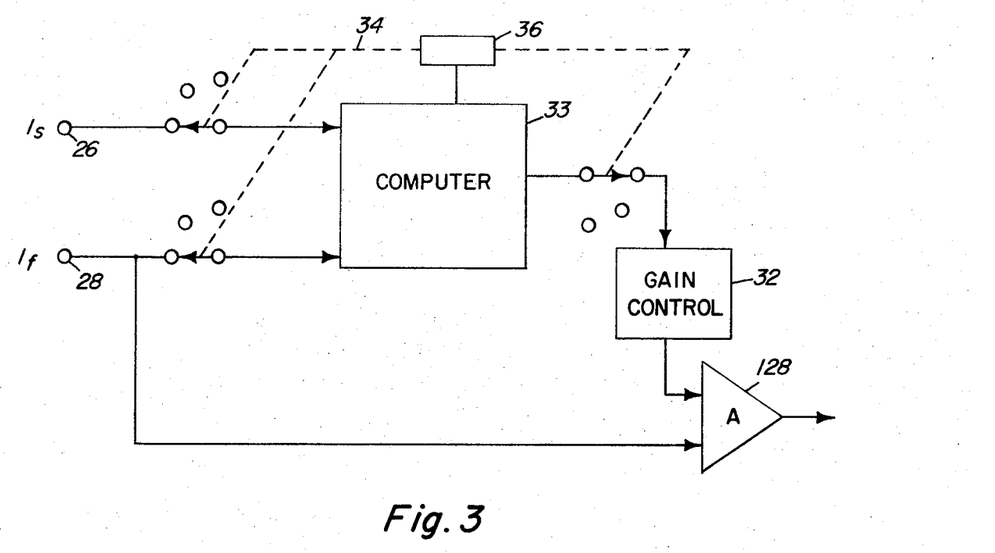
FIG. 3 is a schematic illustration of a periodic calibration system.

An arrangement for periodic calibration adjustment for the fission chamber detectors is shown in FIG. 3. The terminal 28 of each fission chamber portion 31 in the reactor core is connected to the input of a respective gain controlled amplifier 128. (Amplifier 128 is equivalent, for example, to the amplifier of the same reference number shown in FIG. 7 of U.S. Pat. No. 3,565,760.) The gain of amplifier 128 is controlled by a servo or other suitable connection to a respective gain control device 32.

A computer 33, which may be a special purpose or suitably programmed general purpose computer, receives signals from the detectors 30 and 31 via terminals 26 and 28, determines and stores the value of initial signal ratio $R(0)$ for each detector unit 10 and provides a signal to the gain control device 32 proportional to the present (at time $t$) sensitivity of the fission chamber portion 31 by determination of the relationships (6) and (1) above. In response to this sensitivity signal the gain control device 32 sets the gain of amplifier 128 so that the output signal from amplifier 128 is calibrated in accordance with the present fission chamber sensitivity.

The various detector units 10 in the reactor core and the associated gain control devices 32 are sequentially connected to the computer 33 by, for example, a three-section stepping switch 34 which may be actuated by an actuation device 36 controlled by the computer 33. In this manner each detector unit 10 in the reactor core is periodically sensed by the computer and the gain of the respective amplifier 128 is adjusted to maintain fission chamber calibration.

For some applications it may be desirable to provide continuous calibration adjustment of the fission chamber portions 31. This is accomplished by the arrangement illustrated in FIG. 4 by which a computing and gain control system individual to each detector unit 10, rather than a central computer and periodic scanning arrangement of FIG. 3, may be provided. In effect the system of FIG. 4 continuously determines the present sensitivity of the fission chamber portion 31 and provides a signal proportional thereto as a continuous gain control of the amplifier 128.

Figure 4:
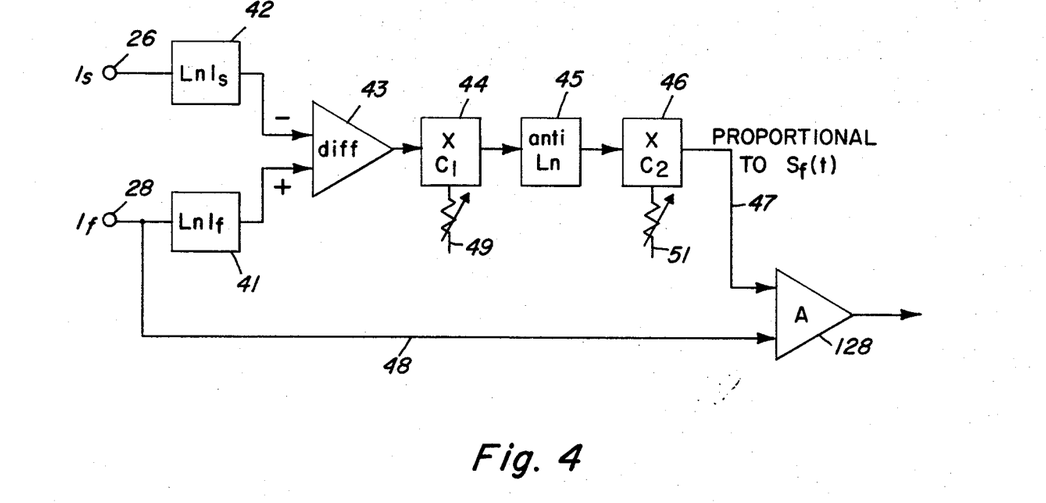
FIG. 4 is a schematic illustration of a continuous calibration system.

The operation of the system of FIG. 4 can be best understood by consideration of the following:

Recalling that $R(t)$ is the ratio of the fission chamber current $I_f$ at time $t$ to the self-powered detector current $I_s$ at time $t$, the relaitonship (6) can be written as:

$$\phi t = (1/\sigma_f - \sigma_s) [LnR(0) - LnI_f(t) + LnI_s(t)]. \quad (7)$$

Combining relationships (7) and (1) provides:

$$S_f(t) = S_f(0) \exp \{(-\sigma_f/\sigma_f - \sigma_s) [LnR(0) - LnI_f(t) + LnI_s(t)]\} \quad (8)$$

Relationship (8) can be written as:

$$S_t(t) = S_t(0)[R(0)]^{\frac{-\sigma t}{\sigma_t - \sigma_s}} \exp\left\{\frac{\sigma_t}{\sigma_t - \sigma_s}[LnI_t(t) - LnI_s(t)]\right\} \quad (9)$$

The cross sections $\sigma_f$ and $\sigma_s$ are known quantities. Therefore, the quantity $\sigma_f/\sigma_f - \sigma_s$ can be represented as a constant $C_1$.

Also, after determination of the initial ratio $R(0)$ and the initial fission chamber sensitivity $S_f(0)$, the quantity $$S_t(0)[R(0)]^{\frac{-\sigma t}{\sigma_t - \sigma_s}}$$

can be represented as a constant $C_2$.

Therefore relationship (9) can be written as:

$$S_f(t) = C_2 \exp \{C_1 [Ln\ I_f(t) - LnI_s(t)]\} \quad (10)$$

Referring now to FIG. 4, a plurality of elements 41–46 are provided to implement this relationship. (The elements 41–46 may be, for example, well-known electronic circuits for providing the indicated functions.)

More specifically, the detector currents $I_f$ and $I_s$ received at terminal 28 and 26, are applied to the inputs of elements 41 and 42, respectively. (The fission chamber current $I_f$ is also applied, over a line 48, to the signal input of amplifier 128.) The elements 41 and 42 provide output signals proportional to the logarithms of the input currents. These output signals are applied to the element 43 (a differential amplifier of unity gain) which provides the subtractive function. The element 44 multiplies the signal by the constant $C_1$. The element 45 provides an output signal proportional to the antilog of its input signal; and element 46 multiplies this signal by the constant $C_2$. The output signal from element 46, therefore, is proportional to the present fission chamber sensitivity $S_f(t)$ and this signal is applied, over a line 47, to amplifier 128 as a gain control signal which thereby continuously maintains the calibration of the fission chamber output signal from the amplifier 128.

Elements 44 and 46 are provided with settable gain controls 49 and 51, respectively, for the purpose of initially adjusting the operation of the system. Namely, the gain of element 44 is adjusted in accordance with the magnitude of the constant $C_1$ while the gain of element 46 is adjusted in accordance with the constant $C_2$, it being noted that the constant $C_2$ includes the magnitudes of the initial fission chamber sensitivity $S_f(0)$ and the initial current ratio $R(0)$. (For example, adjustment of the gain of element 46 may be made by comparing the output signal from amplifier 128 to a predetermined standard.)

Specific embodiments of detector units will now be described with reference to FIGS. 5 and 6.

Figure 5:
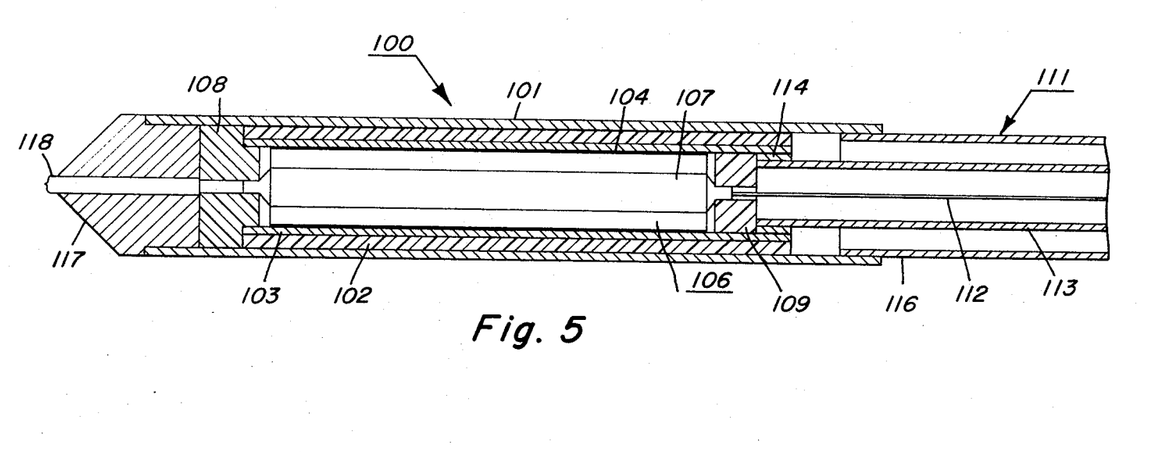
FIG. 5 is a longitudinal cross section view of one embodiment of a detector unit of the invention.

As illustrated in FIG. 5, a detector unit 100 includes a tubular shell 101 enclosing a layer of dielectric 102, a tubular intermediate electrode 103, a layer of neutron activatable material 104 (such as U–235), a gas space 106 and a cylindrical central electrode 107. (The neutron activatable material 104 may be placed on the inner surface of electrode 103, as shown, or on the outer surface of electrode 107 or on both.)

The self-powered portion of detector unit 100 is thus formed by intermediate electrode 103, the dielectric 102 and the shell 101, the latter serving as the collector electrode. The fission chamber portion is formed by the intermediate electrode 103, the layer 104, the gas space 106 and the central electrode 107. The shell 101 may be formed of stainless steel. The dielectric 102 may be aluminum oxide, the intermediate electrode 103 may be formed of rhodium, the gas space 106 may contain argon and the central electrode 107 may be formed of stainless steel.

The central electrode 107 is supported in shell 101 by a pair of annular insulators 108 and 109. At the right-hand end, the shell 101 and electrodes 103 and 107 are connected to a triaxial cable 111 having a center conductor 112 connected to central electrode 107, an intermediate conductor 113 connected by a ring 114 to intermediate electrode 103 and an outer conductor 116 connected to the shell 101. At the left-hand end, the shell 101 is sealed by an end plug 117 containing a pinch-off tube 118 by which the detector may be evacuated, back-filled with appropriate gas, and sealed.

Figure 6:
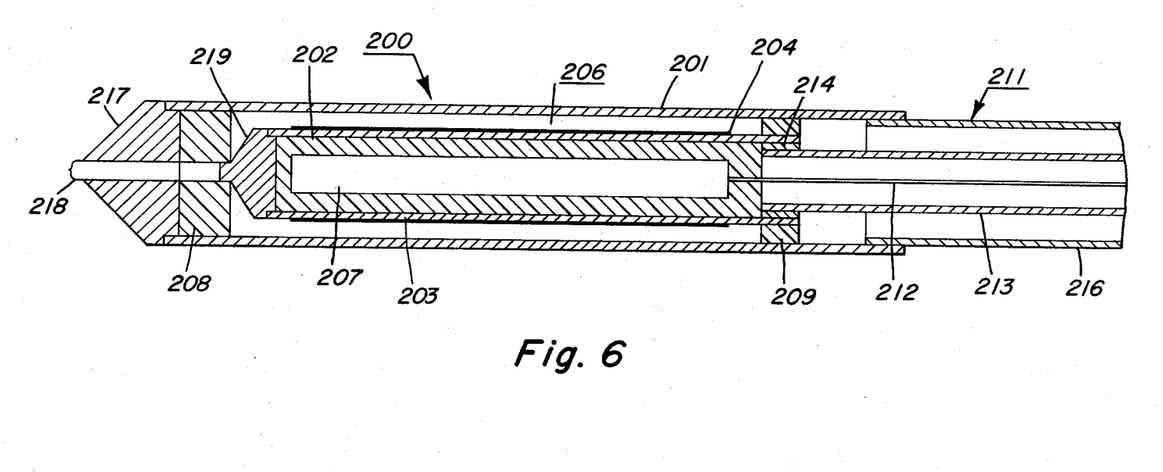
FIG. 6 is a longitudinal cross section view of another embodiment of a detector unit according to the invention.

Another embodiment of a detector unit according to the invention is shown in FIG. 6. As illustrated in FIG. 6, a detector unit 200 includes a tubular shell 201 enclosing a gas space 206, an intermediate electrode 203, a layer of neutron activatable material 204, a layer of dielectric 202, and a central electrode 207, (The neutron activatable material 204 may be placed on the outer surface of electrode 203, as shown, or on the inner surface of electrode 201 or on both.)

In this embodiment the self-powered detector portion is formed by central electrode 207, formed, for example, of rhodium to serve as an emitter, the dielectric layer 202 (for example, aluminim oxide) and the intermediate electrode 203 which may be formed of stainless steel to serve as the collector electrode.

The fission chamber portion is formed by intermediate electrode 203, the layer 204 (for example of fissionable uranium), a gas such as argon in gas space 206, and the shell 201 which serves as the other electrode of the fission chamber.

At its left end, the intermediate electrode 203 is fitted with a plug 219 which is supported in shell 201 by an annular insulator 208. At its right end, the electrode 203 is supported in spaced relation to shell 201 by an annular insulator 209. The electrodes 207 and 203 and shell 201 are connected to respective conductors 212, 213 and 216 of a triaxial cable 211, a connecting ring 214 being provided to bridge between intermediate electrode 203 and conductor 213. At the left end, the shell 201 is sealed by an end plug 217 containing a pinch-off tube 218 for evacuating and backfilling the space 206 with suitable gas.

What is claimed is:

1. A neutron detector system including a first neutron detector of a given type and a second neutron detector of a different type; means for receiving signals from said first and second neutron detectors including means for comparing the magnitudes of said signals and including a variable gain device for receiving the signal from said first neutron detector; and means for adjusting the gain of said device in proportion to the relative magnitudes of said signals from said first and second detectors.

2. A neutron detector system including an ion chamber detector and a self-powered detector; means for receiving signals from said detectors including means for comparing the magnitudes of said signals and including a variable gain amplifier for receiving the signal from said ion chamber; and means for adjusting the gain of said amplifier in proportion to the relative magnitudes of said signals from said detectors.

3. In a nuclear reactor having a fuel core: a plurality of neutron detector units distributed in said core, each of said units including an ion chamber portion and a self-powered portion; for each of said detector units a respective variable gain amplifier for receiving the signal from the ion chamber portion thereof; means for comparing the magnitudes of the signals from the ion chamber and self-powered portions of each said detector unit; and means for adjusting the gain of each of said amplifiers in proportion to the relative magnitudes of the signals from the ion chamber and self-powered portions of the respective detector unit.

4. A system for measuring the neutron flux of a neutron field, comprising: a fission chamber in said field; a self-powered detector in said field adjacent said fission chamber; means for determining the ratio of the signals from said fission chamber and said self-powered detector; means for indicating the initial ratio $R(0)$ at time $t_0$ of said signals and for indicating a subsequent ratio $R(t)$ at a time $t$; and means for determining the flux $\phi$ according to the relationship:

$$\phi t = (1/\sigma_f - \sigma_s) [Ln R(0) - Ln R(t)]$$

where $\sigma_f$ is the thermal neutron absorption cross section of the fissile material in said fission chamber, and $\sigma_s$ is the thermal neutron absorption cross section of the emitter material of said self-powered detector.

5. A system for measuring the neutron flux of a neutron field, comprising: a fission chamber in said field; a self-powered detector in said field adjacent said fission chamber; means for determining the ratio of the signals from said fission chamber and said self-powered detector; means for indicating the initial ratio $R(0)$ at time $t_0$ of said signals and for indicating a subsequent ratio $R(t)$ at a time $t$; and means for determining the neutron exposure $\sigma t$ according to the relationship:

$$\sigma t = (1/\sigma_f - \sigma_s) [Ln R(0) - Ln R(t)]$$

where $\sigma_f$ is the thermal neutron absorption cross section of the fissile material in said fission chamber, and $\sigma_s$ is the thermal neutron absorption cross section of the emitter material of said self-powered detector.

6. A method of calibrating the output signal from an ion chamber detector of a neutron detector unit which includes said ion chamber detector and a self-powered detector, comprising the steps of:
  1. comparing the magnitudes of the signals from said detectors; and
  2. adjusting the level of the signal from said ion chamber in proportion to the relative magnitudes of said signals from said detectors.

7. A method of determining changes in magnitude of the neutron flux of a neutron field by use of a fission chamber and a self-powered detector comprising the steps of:
  1. measuring the initial signals from said fission chamber and said self-powered detector in said neutron field at time $t_0$ and providing a first indication $R(0)$ which is proportional to the ratio of said initial signal from said fission chamber to the initial signal from said self-powered detector;
  2. measuring subsequent signals from said fission chamber and said self-powered detector at a time $t$ and providing a second indication $R(t)$ which is proportional to the ratio of said subsequent signal from said fission chamber to said subsequent signal from said self-powered detector; and
  3. determining the neutron exposure $\phi t$ according to the relationship;

$$\sigma t = (1/\sigma_f - \sigma_s) [Ln R(0) - Ln R(t)]$$

where $\sigma_f$ is the neutron burn-up cross section of the fissile material in said fission chamber, and $\sigma_s$ is the neutron burn-up cross section of the emitter material of said self-powered detector.

8. A method of determining changes in magnitude of the neutron flux of a neutron field by use of a fission chamber and a self-powered detector comprising the steps of:
  1. measuring the initial signals from said fission chamber and said self-powered detector in said neutron field at time $t_0$ and providing a first indication $R(0)$ which is proportional to the ratio of said initial signal from said fission chamber to the initial signal from said self-powered detector;
  2. measuring subsequent signals from said fission chamber and said self-powered detector at a time $t$ and providing a second indication $R(t)$ which is proportional to the ratio of said subsequent signal from said fission chamber to said subsequent signal from said self-powered detector; and 3. determining the neutron flux $\phi$ according to the relationship:

$$\phi = (1/t\ (\sigma_f - \sigma_s)\ [Ln\ R(0) - Ln\ R(t)]$$

where $\sigma_f$ is the neutron burn-up cross section of the fissile material in said fission chamber, and $\sigma_s$ is the neutron burn-up cross section of the emitter material of said self-powered detector.

9. A method of determining the sensitivity of a fission chamber portion of a neutron detector unit which includes said fission chamber portion and a self-powered portion, comprising the steps of:
   1. receiving the initial signals from said fission chamber and self-powered portions in a neutron field and determining a ratio $R(0)$ at time $t_0$ which is proportional to the ratio of said initial signal from said fission chamber portion to said initial signal from said self-powered portion;
   2. receiving subsequent signals from said fission chamber and self-powered portions in said neutron field and determining a ratio $R(t)$ at time $t$ which is proportional to the ratio of said subsequent signal from said fission chamber portion to said subsequent signal from said self-powered portion;
   3. determining the sensitivity $S_f(t)$ at time t of said fission chamber portion in accordance with the relationship:

$$S_f(t) = S_f(0)\ exp\ \{\ (-\sigma_f/\sigma_f - \sigma_s)\ [Ln\ R(0) - Ln\ R(t)]\}$$

where $\sigma_f$ is the burn-up cross section of the fissile material in said fission chamber portion, $\sigma_s$ is the burn-up cross section of the emitter material of said self-powered portion, and $S_f(0)$ is the initial sensitivity of said fission chamber portion; and 4. adjusting the level of the signal from said fission chamber portion in proportion to the sensitivity $S_f(t)$.

10. A method of calibrating the output signal from a fission chamber portion of a neutron detector unit which includes said fission chamber portion and a self-powered portion, comprising the steps of:
   1. at time $t_0$ receiving the initial signal currents $I_f(0)$ from said fission chamber portion and the initial signal current $I_s(O)$ from said self-powered portion and determining a ratio $R(0)$ of $I_f(0)$ to $I_s(0)$;
   2. at time $t$ receiving subsequent signal current $I_f(t)$ from said fission chamber portion and subsequent signal current $I_s(t)$ from said self-powered portion;
   3. determining the sensitivity $S_f(t)$ at time $t$ of said fission chamber portion in accordance with the relationship:

$$S_f(t) = S_f(0)\ exp\ \{-\sigma_f/\sigma_f - \sigma_s\ [Ln\ R(0) - Ln\ I_f(t) - Ln\ I_s(t)]\}$$

where $S_f(0)$ is the initial snesitivity of said fission chamber portion, $\sigma_f$ is the burn-up cross section of the fissile material in said fission chamber and $\sigma_s$ is the burn-up cross section of the emitter material of said self-powered detector.

11. The method of claim 10 including the further step of adjusting the level of the signal from said fission chamber portion in proportion to the sensitivity $S_f(t)$.

12. A neutron detector device including combined ion chamber and self-powered detectors comprising: first, second and third spaced electrodes; a neutron sensitive material disposed between said first and second electrodes and producing ionizing radiation upon neutron irradiation; an ionizable medium filling a space between said first and second electrodes, said first and second electrodes, said neutron sensitive material and said ionizable medium constituting said ion chamber detector; a dielectric material filling a space between said second and third electrodes, one of said electrodes of said second and third electrodes having a substantially greater thermal neutron absorption cross section than the other electrode of said second and third electrodes said second and third electrodes and said dielectric material constituting said self-powered detector; a source of voltage and a first signal responsive means connected in series to said first and second electrodes; and a second signal responsive means connected to said second and third electrodes.

13. A neutron detector device comprising: a sealed chamber, first, second and third spaced electrodes in said chamber; a fissionable material disposed between said first and second electrodes; a dielectric material filling the space between said second and third electrodes, one of said electrodes of said second and third electrodes having a substantially lower thermal-neutron absorption cross section than the other electrode of said second and third electrodes; an ionizable gas filling the voids in said chamber including a space between said first and second electrodes said first and second electrodes with said fissionable material and said ionizable gas therebetween forming an ion chamber detector portion of said device and said second and third electrodes with said dielectric material therebetween forming a self-powered detector portion of said device; a source of voltage and a first signal responsive means connected in series to said first and second electrodes; and a second signal responsive means connected to said second and third electrodes.

14. A neutron detector device comprising; a sealed chamber; first, second and third spaced electrodes in said chamber; a fissionable material disposed between said first and second electrodes; a dielectric material filling the space between said second and third electrodes, one of said electrodes of said second and third electrodes producing fewer electrons in a neutron flux as compared to the other of said second and third electrodes; an ionizable gas filling the voids in said chamber including a space between said first and second electrodes said first and second electrodes with said fissionable material and said ionizable gas therebetween forming an ion chamber detector portion of said device and said second and third electrodes with said dielectric material therebetween forming a self-powered detector portion of said device; a source of voltage and a first signal responsive means connected in series to said first and second electrodes; and a second signal responsive means connected to said second and third electrodes.

15. A neutron detector unit comprising: a sealable chamber containing an ionizable gas; a first electrode, tubular in form, the inner surface of said first electrode being within said chamber; a second electrode, tubular in form, positioned concentrically within said first electrode and spaced therefrom; a third electrode having a cylindrical outer surface positioned concentrically within said second electrode and spaced therefrom; a solid dielectric material filling the space between said first and second electrodes to form therewith a self-powered detector portion of said detector unit, one of said electrodes of said first and second electrodes producing fewer electrons in a neutron flux compared to the other of said first and second electrodes; an amount of neutron sensitive material producing ionizing radiation in response to neutron radiation disposed between said second and third electrode together with an amount of said ionizable gas to form an ion chamber detector portion of said detector unit; a first signal responsive means connected to said first and second electrodes; and a source of voltage and a second signal responsive means connected to said second and third electrodes.

16. The neutron detector unit of claim 15 wherein said neutron sensitive material is fissionable material.

17. The neutron detector unit of claim 15 wherein said first electrode is formed of material from the group consisting of aluminum, cadmium, cobalt, rhodium, silver, vanadium, and alloys thereof.

18. The neutron detector unit of claim 15 wherein said second electrode is formed of material from the group consisting of aluminum, cadmium, cobalt, rhodium, silver, vanadium, and alloys thereof.

19. The neutron detector unit of claim 15 wherein said dielectric material is formed of an oxide of light metal.

20. The neutron detector unit of claim 19 wherein said light metal oxide is a material from the group consisting of aluminum oxide, magnesium oxide, zirconium oxide, silicon oxide, beryllium oxide, yttrium oxide, and mixtures thereof.

21. A neutron detector unit comprising: a sealable chamber containing an ionizable gas; a first electrode, tubular in form, the inner surface of said first electrode being within said chamber; a second electrode, tubular in form, positioned concentrically within said first electrode and spaced therefrom; a third electrode having a cylindrical outer surface positioned concentrically within said second electrode and spaced therefrom; a solid dielectric material filling the space between said second and third electrodes to form a self-powered detector portion of said detector unit, one of said electrodes of said second and third electrodes producing fewer electrons in a neutron flux compared to the other of said second and third electrodes; and an amount of neutron sensitive material producing ionizing radiation in response to neutron radiation disposed between said first and second electrodes together with an amount of said ionizable gas to form an ion chamber portion of said detector unit; a first signal responsive means connected to said second and third electrodes; and a source of voltage and a second signal responsive means connected to said first and second electrodes.

22. The neutron detector unit of claim 21 wherein said neutron sensitive material is fissionable material.

23. The neutron detector unit of claim 21 wherein said second electrode is formed of material from the group consisting of aluminum, cadmium, cobalt, rhodium, silver, vanadium, and alloys thereof.

24. The neutron detector unit of claim 21 wherein said third electrode is formed of material from the group consisting of aluminum, cadmium, cobalt, rhodium, silver, vanadium, and alloys thereof.

25. The neutron detector unit of claim 21 wherein said dielectric material is formed of an oxide of light metal.

26. The neutron detector unit of claim 25 wherein said light metal oxide is a material from the group consisting of aluminum oxide, magnesium oxide, zirconium oxide, silicon oxide, beryllium oxide, yttrium oxide, and mixtures thereof.

* * * * *

UNITED STATES PATENT OFFICE
CERTIFICATE OF CORRECTION

Patent No. 3,760,183    Dated  18 Sept. 1973

Inventor(s)  J. P. Neissel

It is certified that error appears in the above-identified patent and that said Letters Patent are hereby corrected as shown below:

Column 1, line 19, the second occurrence of "matertial" should be --material--; Column 1, line 54, "Treinenk" should be --Treinen--; Column 3, lines 29-30, "voltate" should be --voltage--; Column 4, line 14, "deisgnated" should be --designated--; Column 5, line 27, "relaitonship" should be --relationship--; Column 6, line 66, after 207, instead of a "comma" should be a --period--; Column 8, line 15, "ot" should be --ø t--; Column 8, line 48, after relationship, instead of "semi-colon" should be --colon--; Column 9, line 60, "snesitivity" should be --sensitivity--; Column 10, line 22, after chamber the "comma" should be --semi-colon--; Column 10, line 41, after comprising the "semi-colon" should be --colon--.

Signed and sealed this 29th day of October 1974.

(SEAL)
Attest:

McCOY M. GIBSON JR.                C. MARSHALL DANN
ATTESTING OFFICER                  Commissioner of Patents